(12) United States Patent
Comic

(10) Patent No.: US 6,605,017 B1
(45) Date of Patent: Aug. 12, 2003

(54) CONTINUOUSLY VARIABLE TRANSMISSION APPARATUS

(76) Inventor: Elmir Comic, 1063 U.L.O. Road, app #314, Kelowna, BC (CA), V14 4X6

( * ) Notice: Subject to any disclaimer, the term of this patent is extended or adjusted under 35 U.S.C. 154(b) by 0 days.

(21) Appl. No.: 10/102,340

(22) Filed: Mar. 21, 2002

(51) Int. Cl.[7] .............................. F16H 48/06; F16H 3/44

(52) U.S. Cl. ...................... 475/221; 475/307; 475/312

(58) Field of Search .......................... 475/91, 221, 92, 475/306, 307, 311, 312, 273

(56) References Cited

U.S. PATENT DOCUMENTS

| | | | | |
|---|---|---|---|---|
| 1,600,317 A | * | 9/1926 | Cedillo | 475/306 |
| 3,023,644 A | * | 3/1962 | Maichen | 475/306 |
| 5,106,353 A | * | 4/1992 | Ra et al. | 475/308 |
| 5,564,992 A | * | 10/1996 | Cunningham | 475/257 |
| 5,957,803 A | * | 9/1999 | Fini, Jr. | 475/306 |

* cited by examiner

Primary Examiner—Dirk Wright

(57) ABSTRACT

The present invention is directed to a continuously variable transmission system that includes an asymmetric differential spliter, a collecting planet carrier assembly and steering shaft with continuously variable brake mechanism to translate torque from an input shaft to an output shaft.

1 Claim, 2 Drawing Sheets

CONTINUOUSLY VARIABLE TRANSMISSION APPARATUS

TECHNICAL FIELD

The present invention relates to a continuously variable transmission wherever power input from an input shaft is transmitted to an output shaft without disengaging or changing gears when changing speed with all gears engaged.

BACKGROUND ART

Generally, in a transmission, speed change is done by selecting one of a number of predetermined gear ratios and at the time of effecting a speed change, there is the nuisance of carefully disengaging and changing gears. Conventional continuously variable transmissions are of a belt type which have very complicated structure, are expensive to manufacture and cannot be widely used since they have a limited range of capacity because of wear, noise and slippage.

DISCLOSURE OF INVENTION

The present invention was made in view of the problems as described above. Therefore, an object of the present invention is to provide a simplified continuously variable transmission which responds quickly to a change in load, transmits the rotation force smoothly and changes the speed steplessly by simple construction, reduces manufacturing cost, and provides an improved durability.

DESCRIPTION OF THE DRAWINGS

As seen in FIG. 1 and 1a, the continuously variable transmission apparatus includes a differential splitter, a collecting planet carrier assembly and a steering shaft with continuously variable brake mechanism. In particular, the power generated by an engine (not shown), delivered by input shaft 1 mounted to the differential gears support 2, is split though differential gear 3 in mating engagement with output differential gears 4 and 5. Output differential gear 4 is mounted medially along on steering shaft 6. Sun gear 7 and brake disk 15 are mounted at opposite ends of steering shaft 6. Variable brake 16 operates on brake disk 15. On the output side, output differential gear 5 is mounted to ring gear 8. The rotatable part 9 of a one way clutch assembly 10 is mounted to ring gear 8. The second part 11 of one-way clutch assembly 10 is stationary. Planet gear 12 is rotatably mounted on the planet gear support 13 and rotatably linked by common engagement with Sun gear 7 and ring gear 8. Planet gear support 13 is rigidly mounted to output shaft 14.

Figure 1:
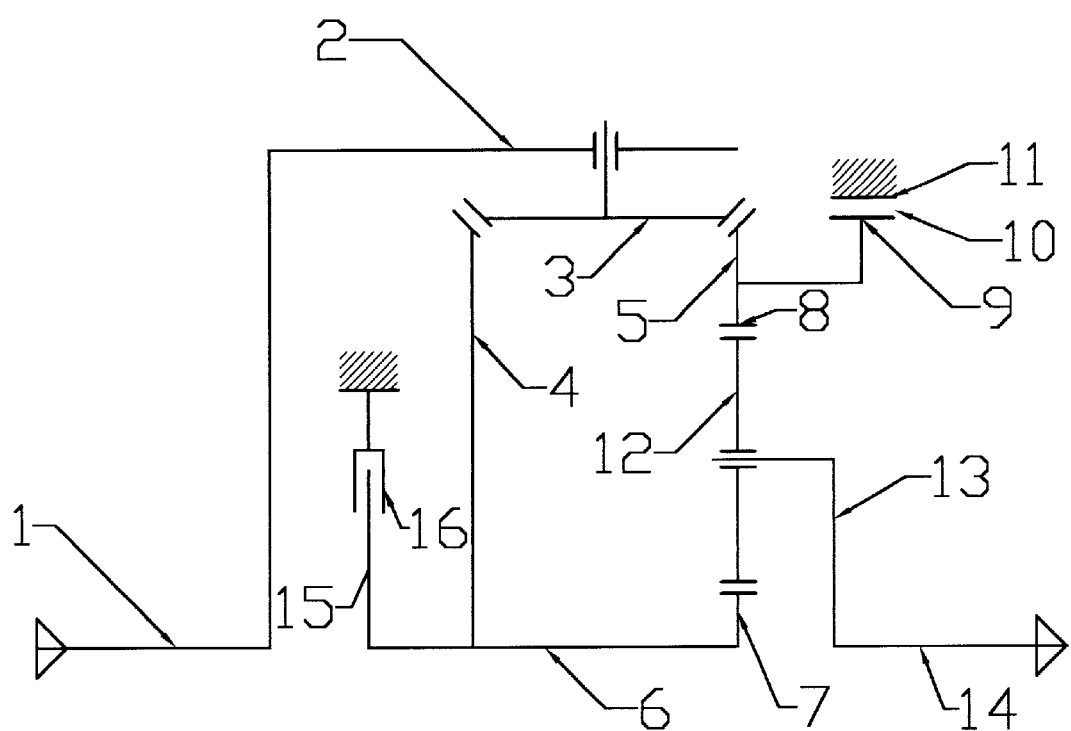
FIG. 1 is a schematic cross-sectional view of the operating assembly.
Figure 1A:
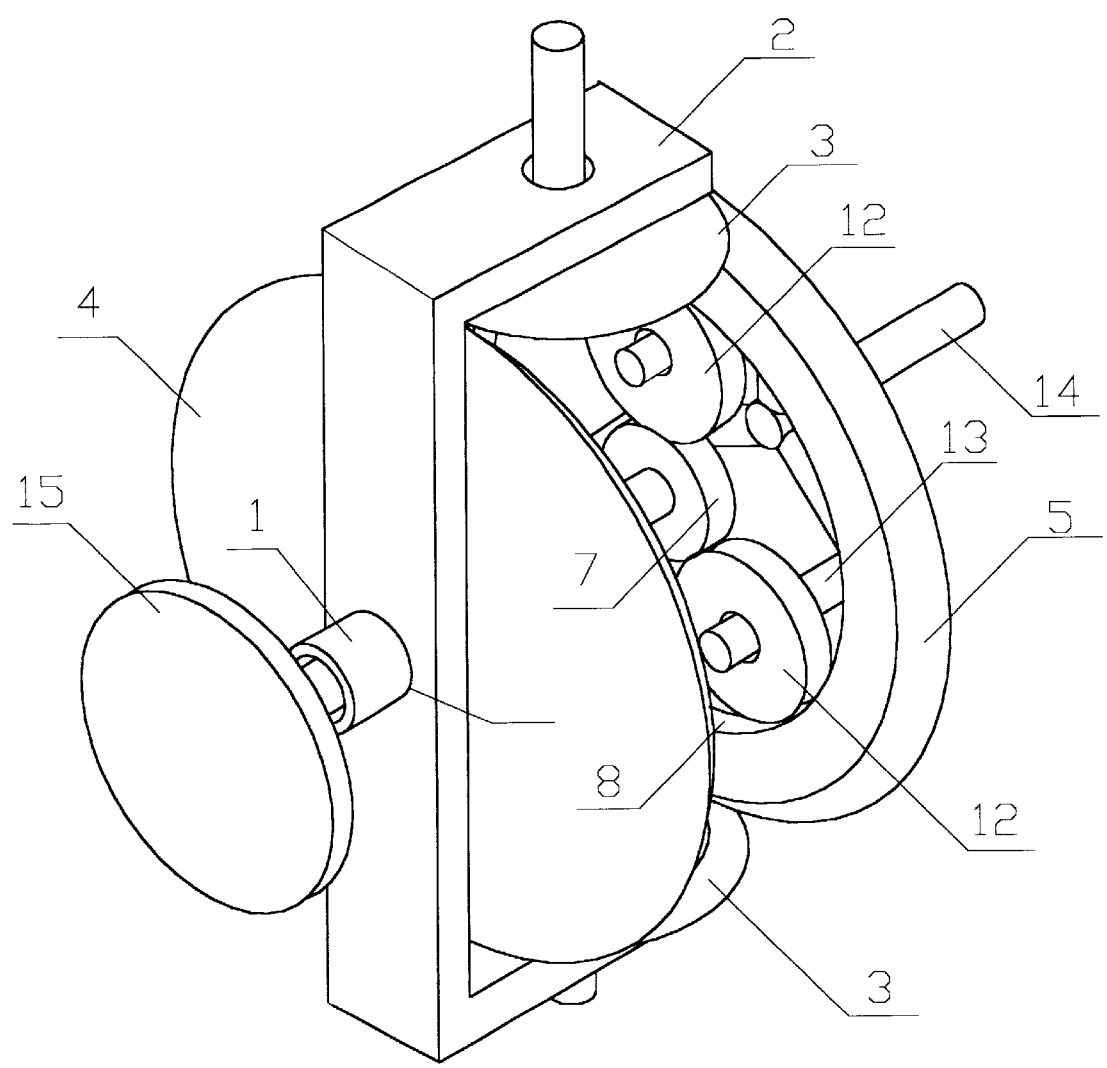
FIG. 1a is an isometric view of the assembly of FIG. 1.

The lowest and highest speed ratio are predetermined through the dimension of Sun gear 7 and ring gear 8. Different dimensions of gears 7 and 8 cause differential torque resistance between gears 4 and 5. This difference in the torque applied to gears 4 and 5 causes different rotation speed from gears 4 and 5. If brake 16 stays inactive, gear 4 will have the highest rotation speed and gear 5 the lowest rotation speed. The transmission is at its highest ratio, which may be thought of as equivalent to the first speed of prior art manual transmissions. A continuously variable speed ratio change is achieved through an increase of the torque resistance of gear 4 on gear 3 through an increase of braking resistance applied to brake disk 15. The lowest transmission rotation ratio and the highest rotation speed on the output shaft is achieved by braking of brake disk 15 to a complete stop, thereby completely stopping rotation of steering shaft 6.

The transmission of the present invention can be used in different appliances and different transportation vehicles. Depending on the additional energy the appliance or the vehicle has at its disposal, brake 16 may take many forms and still remain within the scope of this invention. Brake 16 may, for example, be a friction or an electro-magnetic, or a hydraulic brake. The least expensive is using a friction brake. Friction brakes are also relatively simple to exchange, however, they may not be as durable as other forms of brakes. The best efficiency might have the electro-magnetic brake-power of a reverse electro-motor, because the breaking energy going to be transform into electrical power.

What is claimed is:

1. A continuously variable transmission apparatus usable with a power supply system to transfer power from an input shaft 1 to an output shaft 14, comprising:
   a) an asymmetrical differential spliter means including;
      (I) a differential gears support 2 directly monted on and driven by said input shaft 1;
      (II) a differential gear 3 rotatably monted on said differential gears support 2 and mating engaged with output differential gears 4 and 5
      (III) said output differential gear 4 monted medially along on steering shaft 6
      (IV) said output differential gear 5 monted to ring gear 8 and to the rotatable part 9 of a one-way clutch assembly 10
   b) a collecting planet carrier assembly including;
      (I) a Sun gear 7 monted on said steering shaft 6 and meshed with planet gear 12;
      (II) said ring gear 8;
      (III) said planet gear 12 rotatably mounted on planet gear support 13 and rotatably linked by common engagement with said Sun gear 7 and said ring gear 8;
      (IV) said gear support 13 rigidly mounted to said output shaft 14
   c) said steering shaft 6 with a brake disk 15 and stacionary brake 16.

* * * * *